Patented May 4, 1943

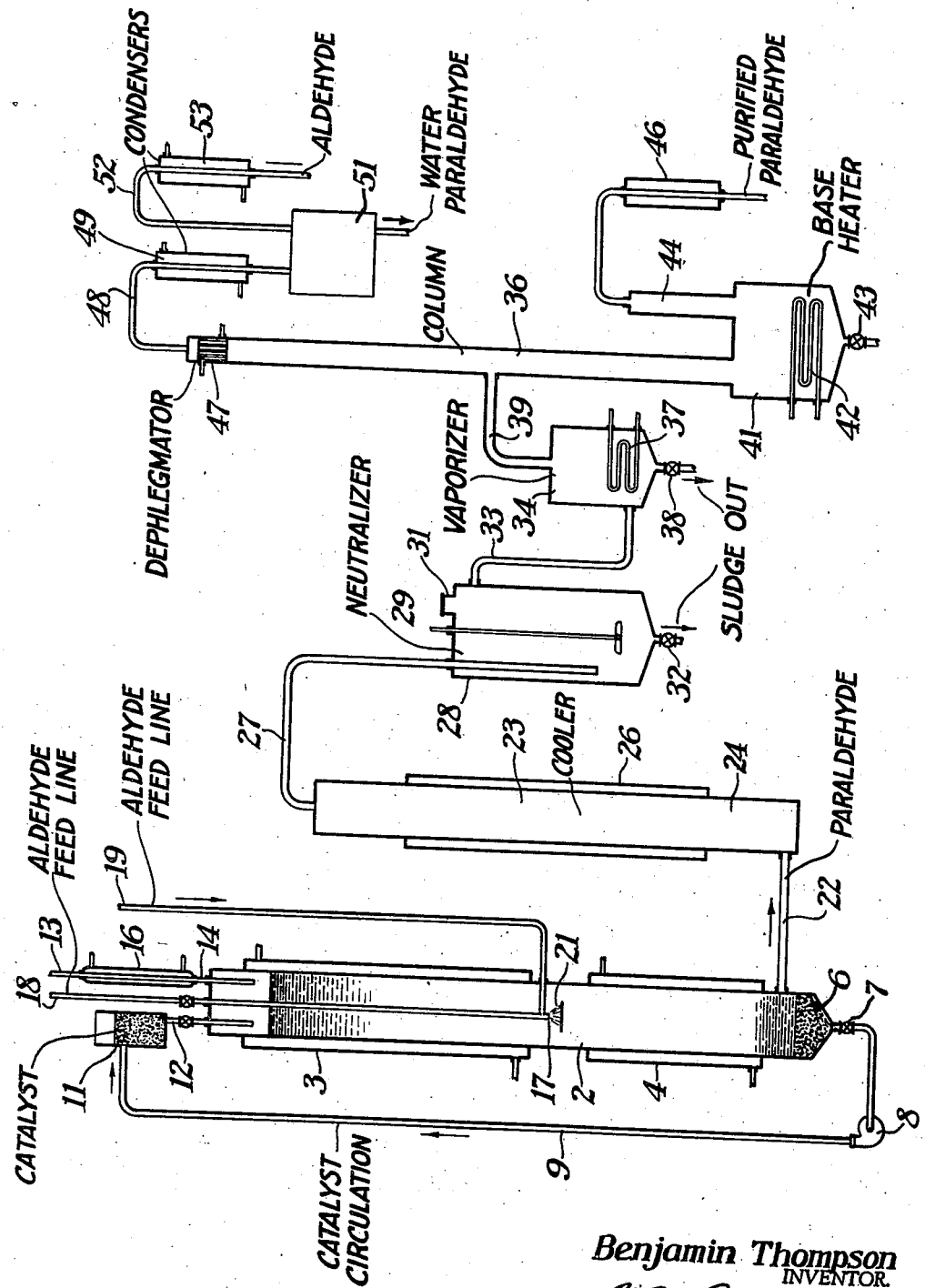
Benjamin Thompson
INVENTOR.

2,318,341

UNITED STATES PATENT OFFICE 2,318,341

PROCESS FOR THE POLYMERIZATION OF ALIPHATIC ALDEHYDES

Benjamin Thompson, Kingsport, Tenn., assignor to Eastman Kodak Company, Rochester, N. Y., a corporation of New Jersey Application July 22, 1937, Serial No. 155,064

11 Claims. (Cl. 260—340)

This invention relates to processes for the polymerization of aliphatic aldehydes, and more particularly to a continuous process for polymerizing acetaldehyde to paraldehyde.

The polymerized products of aliphatic aldehydes have a large number of commercial uses, consequently, a number of methods for the preparation of such materials have been developed. However, many of these processes are only susceptible to being carried out on a small intermittent scale, inasmuch as they are primarily directed to batch operation.

I have found a method for the polymerization of aliphatic aldehydes which may be continuously operated with the production of high yields of the desired product.

One object of my invention is to provide a process for the polymerization of aliphatic aldehydes which is continuous. Still another object is to provide a catalytic process for the polymerization of aliphatic aldehydes wherein the catalyst may be replaced and introduced without material interruption of the process. A further object is to provide a process for the production of paraldehyde from acetaldehyde wherein the yields are improved.

Still another object is to provide a procedure for refining and otherwise improving crude polymerized products. Still another object is to provide a method of distilling mixtures containing paraldehyde in order to recover relatively pure paraldehyde therefrom.

Another object is to provide apparatus for carrying out a continuous process for the polymerization of aliphatic aldehydes. A still further object is to provide an apparatus wherein the catalyst may be removed or supplemented. A still further object is to provide an apparatus for the preparation of paraldehyde wherein the formed paraldehyde may be subjected to cooling treatments.

These objects are accomplished by my novel process wherein aliphatic aldehydes are polymerized and the resultant products subjected to treatments which increase the yield and improve the quality of the products of polymerization.

My novel process may be better understood by reference to the accompanying drawing which forms a part of the present invention:

The attached figure is a semi-diagrammatic side elevation showing my apparatus set up for continuously polymerizing an aliphatic aldehyde. Certain parts have been shown broken away or on section for clarity.

In the figure 2 designates a reaction vessel or column which contains the reacting solution of aliphatic aldehyde, polymerized aldehyde and catalyst. The temperature in this reaction vessel or column is controlled by means of jackets 3 and 4. In place of these temperature controlling jackets, cooling coils or cooling plates may be introduced into the column, or other equivalent means employed. The column 2 terminates in a cone-shaped or sump construction 6. This construction is connected through valved conduit 7, pump 8 and conduit 9 to a catalyst reservoir 11. Catalyst reservoir 11 is connected to the upper portion of the reaction tower 2 by means of valved conduit 12.

The upper portion of the reaction tower is also provided with a vent means, designated 13. This means may comprise a conduit 14 enclosed by a condenser 16. Extending into the reaction tower 2 at some intermediate point 17 are inlet conduits 18 or 19. These conduits terminate in a diffuser or spray head 21.

Conduit 22 connects the lower part of the reaction tower with cooling chamber 23. This cooling chamber may be of various constructions and will comprise a tank 24 having associated therewith temperature controlling means 26. As indicated with respect to tower 2, the temperature controlling means may comprise a jacket external of the tank, or cooling coils or equivalent means may be inserted in the tank.

The upper portion of the tank 24 is connected by means of conduit 27 to a mixing vessel 28. This mixing vessel may be of any usual construction, and contains an agitator 29, charging opening 31 and valved draw-off 32. Mixing vessel 28 is connected by means of conduit 33 to a feed heater or vaporizer 34, which, in turn, is connected to the intermediate section of a distillation column 36. These parts 34, 36 and associated parts, are similar to the distillation columns shown in U. S. Patent 1,908,239 and Gordon Patent 2,049,440 that is, the vaporizer 34 is provided with heating means 37, a valved draw-off 38. The conduit 39 conducts the vapors to column 36.

Column 36 is provided at its base with base heater 41 which contains heating means 42. In place of this base heater construction described it is possible to employ a calandria type heating device. A sediment draw-off is provided at 43. The base heater may also be provided with a short column 44 which is connected to condenser 46.

The upper portion of column 36 is provided with a dephlegmator 47 for furnishing reflux. The conduit 48 connects the upper portion of the column through condenser 49 to receiver 51. The vent conduit 52 leads through another condenser 53 back to aldehyde feed or storage.

The functioning of these various pieces of apparatus will be more apparent from the following example, which is set forth merely to illustrate a preferred form of my invention.

Assuming that my process is in operation for the manufacture of paraldehyde from acetaldehyde, the reaction tower 2 contains a solution of aldehyde, paraldehyde and catalyst. In the example under description, the catalyst comprises sulfuric acid. However, other catalysts, such as phosphoric acid, hydrochloric acid or salts of various inorganic acids, may be employed, or, if desired, hydrochloric acid gas may be injected into the reaction mixture. The catalyst may, if desired, be in a solvent such as acetone, organic acids and ethers. I find that a 50%–80% solution of sulfuric acid (without an organic solvent) is quite satisfactory.

In the instances where a solvent is employed, similar quantities of catalyst also function satisfactorily.

The sulfuric acid is slowly fed into the reaction vessel from the catalyst reservoir 11. It mixes with and dissolves in the reaction mixture up to its solubility limit. Any excess catalyst falls to the bottom of the reaction tower as at 6, and is withdrawn through conduit 7, from which it may be pumped through conduit 9 back to the catalyst reservoir. Preferably, I employ a catalyst concentration below its solubility limit, hence the aforementioned feature may be dispensed with. However, it may be useful in instances where excess catalyst has been added. In the catalyst reservoir additional sulfuric acid may be supplied to make up for that consumed or lost in the reaction.

Acetaldehyde is fed into the reaction liquid contained in tower 2 at some intermediate point. Preferably, the acetaldehyde is injected below the surface of the reaction mixture. I find that highly desirable results are obtained by injecting an oxygen-free acetaldehyde into a reaction mixture maintained approximately between 25 and 35° C., although higher or lower temperatures may be employed, as 10° C. to 100° C., for example.

By feeding the aldehyde through conduit 18 into and below the surface of the reaction mixture, it absorbs part of the heat from the reaction mixture and thereby becomes partially or entirely vaporized on entering the reaction mixture through distributing device 21. The rising of the vapors through the reaction mixture provides mixing and solution. While such procedure comprises desirable technique, I find that the acetaldehyde may also be fed to distributing device 21, through conduit 19, and, if necessary, mechanical agitation may be supplied in the reaction tower.

As already indicated, I prefer to employ an oxygen-free acetaldehyde and to carry out the reaction in the absence of an oxidizing atmosphere. This may be obtained by evacuation or the displacement of any air or oxygen contained in the chamber by inert gas, such as nitrogen or the like. The refrigerated reflux condenser 16, attached to conduit 14, is provided for preventing the loss of acetaldehyde vapors from the system. It is also possible at this point to evacuate any air from the system or to inject an inert gas.

The acetaldehyde, in the presence of sulfuric acid and under the temperature conditions of reaction tower 2, readily polymerizes to paraldehyde. The reaction product formed is withdrawn near the bottom of the tower, as at 22. The volume of reaction products withdrawn may be controlled and maintained by the arrangement of the level of conduit 27.

In accordance with my preferred procedure, the reaction product containing paraldehyde is withdrawn into cooling chamber 24. In this chamber the velocity of flow will be low enough to permit any suspended catalyst to settle. In addition, the reaction mixture may be cooled by means of circulating a cooling medium in the jacket 26. I have found that cooling and maintaining the reaction mixture at a temperature from about 10 to 25° C. causes a favorable shift in the reaction equilibrium toward the formation of paraldehyde. Also, the solubility of catalyst in the reaction materials is reduced. That is, this treatment, which comprises subjecting the reaction mixture to cooling in chamber 24, improves the yields of paraldehyde obtained. I find that holding the unneutralized crude paraldehyde mixture for several hours at approximately 10 to 25° C. before passing it to the refining treatment, to be described hereinafter, is highly desirable.

The crude reaction product containing paraldehyde overflows through conduit 27 into mixing vessel 28. The continuous introduction of acetaldehyde into either feed lines 18 or 19, or both will cause an equivalent amount of reaction material to be displaced from reaction tower 2. In mixing vessel 28 the crude paraldehyde is preferably subjected to the following novel treatment. The crude would be agitated with alkali carbonate, in slight excess over the acid present, for about ten minutes to about two hours and the treatment would be followed by agitating with a small per cent (0.002% to .05%) of ammonia for a short period, of, for example, 5 to 15 minutes. Note is made of the fact that the crude preferably would be vaporized in the presence of excess alkali carbonate. It is then vaporized directly from the neutralized salts and excess carbonate. The steps may be further illustrated by the following example:

I have found that paraldehyde (produced from acetaldehyde using a sulphuric acid catalyst) tends to go back to acetaldehyde on distillation at atmospheric pressure even though an excess of $Na_2CO_3$ is used in neutralizing the acid catalyst and acetic acid formed. I have found that this reversal may be prevented by the addition of a very small quantity of ammonium hydroxide or gaseous ammonia as desired. For example, in a 2,500 lb. batch of crude paraldehyde containing .01 to .3% $H_2SO_4$, 5–10% unconverted aldehyde, and 90–95% paraldehyde, enough $Na_2CO_3$ is added to be 25 to 50% in excess of the $H_2SO_4$ content and agitated 30 minutes then 1 lb. of ammonium hydroxide (28% $NH_3$) is added and the agitation continued for a few minutes before distillation. The temperature is kept 10°–20° C. until the catalyst has been neutralized and $NH_4OH$ added. The amount of acetaldehyde distilled off corresponds to the analysis before distillation and the paraldehyde contained less than 1% acetaldehyde. Complete neutralization can be done wtih ammonia but this is not necessary.

Various alkali carbonates or hydroxides, such as calcium or sodium carbonate, calcium hydroxide or the like, in a dry or anhydrous condition, may be employed. Any sludge and the like formed may be removed from mixer 28 through the draw-off 32. That is, before the crude is distilled, it is highly desirable that all traces of acid catalyst be neutralized. If neutralization is not accomplished, reversal of reaction to reform acetaldehyde at the expense of the product, paraldehyde, takes place. When $H_2SO_4$ is used as a catalyst the treatment with ammonia and carbonate is preferred. By their use, reversal of reaction during distillation is minimized and yields are improved. I have also found that it is possible to distill continuously without the use of ammonia if the alkali carbonate treatment is prolonged, or if reduced pressure is used. The ammonia treatment may not be employed if other acids than $H_2SO_4$ are used as catalyst. $H_2SO_4$ as catalyst, however, has much advantage over other acids in the rapid and continuous production of crude.

The improved crude paraldehyde then overflows through conduit 33 into the feed evaporator 34. This mixture in 34, which contains paraldehyde, water formed by neutralization and various other sources, and unreacted acetaldehyde is vaporized and passes through conduit 39 into distillation column 36, any residue being withdrawn at 38.

The paraldehyde mixture in 36 is rectified and water, paraldehyde and acetaldehyde pass through conduit 48, condenser 49; the paraldehyde and water being collected at 51. A part of the vapors passing to conduit 48 are condensed at 47 and returned as reflux. In lieu thereof, however, a part of the condensate collected in receiver 51 may be returned to the head of the column at 47 for reflux. The aldehyde vapors escape from receiver 51 through conduit 52 and may be liquefied by means of condenser 53 from which they are returned to storage feed, or other use. The paraldehyde withdrawn from 51 may also be re-employed in the process. With further regard to this distillation, condenser 49 may be run hot so that the acetaldehyde would be flashed off to the next condenser. This would permit the paraldehyde and water to separate into two phases in which case receiver 51 would also be constructed as a decanter from which the top paraldehyde layer would be returned as reflux and water layer only being withdrawn at the bottom.

At the base of column 36 the refined paraldehyde may be removed as a liquid, or it may be vaporized through 44 and condensed at 46. Either atmospheric or vacuum distillation may be employed. The use of an inert atmosphere or the absence of oxidizing conditions is preferred in the distilling step, as in other parts of the process. The maintenance of such conditions in my process increases the velocity of polymerization, and by its use, a saving in size of equipment and time of reaction obtained.

Although I have described a process carried out at atmospheric pressure, I also propose to polymerize acetaldehyde to paraldehyde under moderate pressures, that is up to 100 pounds gauge. This may easily be accomplished continuously in the apparatus and processs described. The use of pressure would be confined to the reaction vessel and its reflux condenser.

The advantage in the use of pressure lies in enabling the major portion of the reaction to be carried out at a higher temperature. The higher temperature in turn permitting the use of warmer and less expensive cooling medium thus reducing refrigeration costs.

For example by using 30 pounds pressure the boiling point of acetaldehyde is raised to approximately 51° C. This would permit a reaction temperature in the range of 70° C. This would permit water to be used to carry away the bulk of heat of reaction liberated in the top section of the reaction vessel and in its condenser.

For example, I have used —18° C. brine. The capacity of a refrigerating machine producing brine at —18° C. is less than half of its rating in tons of refrigeration in producing brine at 0° C. Yet the use of but 15 pounds pressure in the reaction chamber permits the use of 0° C. brine and still permits the same temperature difference in the reaction vessel.

Thus large savings can be effected by the use of only moderate pressures in the reaction vessel.

From a consideration of the above examples, it is apparent that I have provided novel procedure whereby an aliphatic aldehyde may be converted to polymers thereof. My process and apparatus possess a number of advantages. For example, the reaction of an aldehyde to form an acid polymerization product, such as paraldehyde, as well as the reaction with an alkaline catalyst to form an aldol are strongly exothermic, and if the heat is not carried away rapidly, a tar formation may result. Hence, in carrying out the reaction, if a batch system is used involving a large body of aldehyde, it is very difficult to carry away the large amount of heat. However, my process and apparatus have the advantage over batch-wise processes in that only a small volume of highly reactive aldehyde is present at any one time. This is desirable in that it removes the possibility of a large batch of aldehyde reacting more rapidly than the cooling means can control and thus becoming too violent.

The advantage of feeding the aldehyde below the surface and preferably somewhere near the center of the vessel can be seen more readily by considering the vessel to be in two sections. In the top section, from slightly below the diffuser 21 to the surface, the bulk of the reaction occurs. The constant boiling of the incoming liquid and vapor of acetaldehyde provides rapid agitation, giving better heat transfer in this top section in which most of the heat must be removed. The boiling also accomplishes even distribution to the very small amount of catalyst and prevents layers of unreacted aldehyde from forming in the reaction chamber. In operation the temperature of the feed and this section of the reaction vessel are preferably controlled so that boiling of the aldehyde is smooth and merely sufficient to cause good agitation. Boiling is moderate enough so that only a small part of the feed must be condensed in the reflux condenser 16.

In addition to mixing caused by boiling as the liquid in the top section becomes strong in product the paraldehyde falls to the lower section due to its higher gravity. This also is of aid in causing rapid distribution of catalyst and prevents strata of highly reactive material from forming on top.

In the lower section of the reaction vessel agitation is very slight. The temperature is preferably maintained below the boiling point of the solution. Here again it is possible to take advantage of the difference in gravity of the product over the aldehyde and the more reacted portions of liquid fall to the base and are withdrawn first. This effect is definite and visible in glassware and except for this, the flow in the lower section is more or less quiescent and uniform. As liquid moves to the base of the vessel it reacts uniformly toward equilibrium and the heat of reaction is removed by the jacket. Flow and catalyst concentration can be regulated so that the reaction has reached equilibrium on withdrawal in line 22 or the violent part of the reaction may have taken place permitting it to continue to equilibrium in the cooler 23.

Therefore, I have provided an apparatus to continuously carry out a difficultly controlled reaction in which the bulk of reaction may be carried out in a small vessel having a high cooling surface to volume ratio and having only a small volume of highly reactive material involved at any one time in connection with a larger vessel having a large volume to surface ratio in which the reaction is carried to equilibrium, thus permitting cooling surfaces to be used at high efficiency at all times.

Although I have described my process and apparatus particularly with respect to the polymerization of acetaldehyde to paraldehyde, inasmuch as they are particularly suitable for this reaction, my invention has wider application. For example, propionaldehyde and various other higher aldehydes may be polymerized in my apparatus. By altering temperature and other conditions of operation, acetaldehyde may be continuously converted into metaldehyde. By the addition of alkali catalyst at 11, my apparatus may be employed for the production of alkali condensation products of aldehydes. That is, aldol may be continuously manufactured by adding a sodium hydroxide or other alkali solution at 11. The temperature of the apparatus would be maintained at between about 5-25° C. The aldol formed would be removed to the neutralizer 29 where in this instance acid, such as acetic acid, would be added. Therefore, my invention is not to be restricted except insofar as necessitated by the prior art and the spirit of the appended claims.

What I claim is:

1. A process for the production of pure paraldehyde which comprises subjecting a mixture containing paraldehyde, acetaldehyde and an inorganic acid component to treatment with an alkali, vaporizing the treated reaction materials and conducting the vapors to an intermediate point of a rectification treatment, withdrawing paraldehyde, water and aldehyde as head products in the rectification treatment, and withdrawing purified paraldehyde from a lower point in the distillation treatment.

2. In a process for the production of a relatively pure aldehyde reaction product, the steps which comprise subjecting a mixture containing said reaction product, unreacted aldehyde, and neutralizing component, to a vaporization treatment wherein the volatilized aldehyde and reaction product are vaporized away from the solid residue to an intermediate point of a rectification treatment, applying the rectification treatment to said volatilized components, and withdrawing aldehyde and water as head products from the rectification treatment, and withdrawing the purified aldehyde reaction product from a lower point in this rectification.

3. In a continuous process for producing reaction products comprising paraldehyde and homologues thereof by polymerization of a lower saturated aliphatic aldehyde having at least two carbon atoms in its molecule, the steps which comprise injecting said lower aliphatic aldehyde below the surface of an elongated reaction mixture comprising said aldehyde, the reaction product being produced and an acidic polymerization catalyst, so that the entry of the lower aliphatic aldehyde below the surface causes substantial agitation and mixing, permitting the reaction product to flow downwardly and below the point of said aldehyde introduction to a quiescent zone and substantially continuously removing the product from said quiescent zone.

4. In a continuous process for producing the reaction products comprised of paraldehyde and homologues thereof by polymerization of a lower saturated aliphatic aldehyde having at least two carbon atoms in its molecule, the steps which comprise introducing said lower aliphatic aldehyde below the surface of an elongated reaction mixture comprised of said aldehyde, the reaction product therefrom, and catalyst, so that the entry of the aldehyde below the surface causes agitation and mixing, conducting the introduction of aldehyde and polymerization thereof under a gauge pressure up to 100 pounds per square inch, permitting the reaction product to flow downwardly and below the point of said aldehyde introduction to a quiescent zone and substantially continuously removing the product from said quiescent zone.

5. In a continuous process for producing reaction products comprising paraldehyde and homologues thereof by polymerization of a lower saturated aliphatic aldehyde having at least two carbon atoms in its molecule, the step which comprises introducing a substantially oxygen-free lower aliphatic aldehyde below the surface of an elongated reaction mixture comprising said aldehyde, the reaction product being produced and an acidic polymerization catalyst, so that the entry of the lower aliphatic aldehyde below the surface causes substantial agitation and mixing, permitting the reaction product to flow downwardly and below the point of said aldehyde introduction to a quiescent zone and substantially continuously removing the product from said quiescent zone.

6. In a continuous process for producing reaction products comprising paraldehyde and homologues thereof by polymerization of a lower saturated aliphatic aldehyde having at least two carbon atoms in its molecule, the steps which comprise introducing a substantially acetic acid-free acetaldehyde below the surface of an elongated reaction mixture comprising said aldehyde, the reaction product being produced and an acidic polymerization catalyst, so that the entry of the lower aliphatic aldehyde below the surface causes substantial agitation and mixing, permitting the reaction product to flow downwardly and below the point of said aldehyde introduction to a quiescent zone and substantially continuously removing the product from said quiescent zone.

7. In a continuous process for producing reaction products comprising paraldehyde and homologues thereof by polymerization of a lower saturated aliphatic aldehyde having at least two carbon atoms in its molecule, the steps which comprise injecting said lower aliphatic aldehyde below the surface of an elongated reaction mixture comprising said aldehyde, the reaction product being produced and an acidic polymerization catalyst, so that the entry of the lower aliphatic aldehyde below the surface causes substantial agitation and mixing, permitting the reaction product to flow downwardly and below the point of said aldehyde introduction to a quiescent zone, substantially continuously removing the reaction product from said quiescent zone and holding the withdrawn reaction product for a period in another reaction zone at a lower temperature than the temperature prevailing at the point of introduction of the aldehyde.

8. A process for polymerizing acetaldehyde which comprises substantially continuously injecting acetaldehyde below the surface of an elongated reaction mixture under a gauge pressure between 5–60 pounds, said reaction mixture comprising an inorganic acid catalyst, the product of the reaction, and acetaldehyde, said injecting of aldehyde causing agitation and mixing within the reaction mixture, maintaining the reaction mixture at a temperature between 5° C. and 80° C., withdrawing at least a part of the reaction product from the reaction mixture and holding the withdrawn product in a cooler for at least the major part of one hour's time.

9. A process for producing pure paraldehyde which comprises substantially continuously contacting acetaldehyde with an elongated reaction mixture containing sulfuric acid under conditions whereby paraldehyde is formed, said acetaldehyde being introduced a substantial distance below the surface of the reaction mixture and into contact with the main body of the reaction mixture, withdrawing at least a part of the paraldehyde formed by the reaction, conducting the withdrawn paraldehyde to a cooler, holding the paraldehyde therein for at least a fraction of an hour, then subjecting it to treatment which neutralizes any sulfuric acid contained therein, and subjecting the neutralized paraldehyde mixture to a distillation treatment wherein paraldehyde, water and acetaldehyde are obtained as head products and purified paraldehyde as a tail product.

10. A process for treating acetaldehyde which comprises substantially continuously injecting acetaldehyde a substantial distance underneath the surface of and into the main body of an elongated reaction mixture whereby agitation is obtained, maintaining the reaction mixture under pressure and at a temperature above 10° C., reflux-condensing vapors evolved from this reaction mixture, gravity-separating a product strong in paraldehyde, and collecting the product at a point substantially below the feed.

11. A process for polymerizing a lower aliphatic aldehyde which comprises substantially continuously injecting lower aliphatic aldehyde below the surface of an elongated reaction mixture under gauge pressure between 5–60 pounds, said reaction mixture comprising an inorganic acid catalyst, the product of the reaction, and lower aliphatic aldehyde, said injecting of aldehyde causing agitation and mixing within the reaction mixture, maintaining the reaction mixture at a temperature between 5° C. and 80° C., withdrawing at least part of the reaction product from the reaction mixture and holding the withdrawn product in a cooler for at least the major part of one hour.

BENJAMIN THOMPSON.